US006962074B2

(12) United States Patent
Lenzen et al.

(10) Patent No.: US 6,962,074 B2
(45) Date of Patent: Nov. 8, 2005

(54) METHOD FOR TESTING A STABILIZING SYSTEM OF A MOTOR VEHICLE BY TILTING AND ROTATING THE VEHICLE

(75) Inventors: Sascha Lenzen, Gummersbach (DE); Klaus Wolfrum, Erlangen (DE); Goetz Knupfer, Vohburg (DE); Bernhard Flaig, Buxheim (DE); Karl Seyberth, Greding (DE); Gero Wittig, Ingolstadt (DE)

(73) Assignees: Siemens Aktiengesellschaft, Munich (DE); Audi AG, Ingolstadt (DE)

( * ) Notice: Subject to any disclaimer, the term of this patent is extended or adjusted under 35 U.S.C. 154(b) by 0 days.

(21) Appl. No.: 11/052,137

(22) Filed: Feb. 9, 2005

(65) Prior Publication Data

US 2005/0145034 A1 Jul. 7, 2005

Related U.S. Application Data

(60) Division of application No. 09/965,886, filed on Oct. 1, 2001, now Pat. No. 6,865,802, which is a continuation of application No. PCT/DE00/00957, filed on Mar. 29, 2000.

(30) Foreign Application Priority Data

Mar. 31, 1999 (DE) ................................ 199 14 820

(51) Int. Cl.[7] ................................ G01M 17/00
(52) U.S. Cl. ................................ 73/121; 73/112; 701/82
(58) Field of Search ................................ 73/669, 670, 121, 73/112; 701/29, 36, 37, 38, 70, 71, 82

(56) References Cited

U.S. PATENT DOCUMENTS

| | | | |
|---|---|---|---|
| 3,818,579 | A | 6/1974 | Pietrelli et al. |
| 3,828,614 | A | 8/1974 | Borg |
| 4,263,809 | A | 4/1981 | Petersen et al. |
| 4,937,929 | A | 7/1990 | Nokajima et al. |
| 5,884,399 | A | 3/1999 | Bergström et al. |
| 5,987,726 | A | 11/1999 | Akeel |

(Continued)

FOREIGN PATENT DOCUMENTS

| | | |
|---|---|---|
| DE | 2 165 244 | 7/1972 |
| DE | 31 44 621 | 9/1982 |
| EP | 0 378 743 | 7/1990 |
| FR | 2 677 155 | 12/1992 |

(Continued)

*Primary Examiner*—Eric S. McCall
(74) *Attorney, Agent, or Firm*—Sughrue Mion, PLLC

(57) ABSTRACT

A dynamic test fixture has a support frame (3) whose dimensions (31) in the direction of a transverse axis (y) are smaller than a distance between the wheels of a vehicle (8). Via a first unit (71*a,* 71*b,* 71*c*) of a controllable adjusting device (7), the support frame (3) is displaced approximately vertically underneath the vehicle (8) so that the vehicle (8) is moved into a raised testing position. A second unit of the controllable adjusting device (7) acts on the support frame (3) in such a way that the vehicle (8) is moved into at least one position (Nx, Ny) that deviates from the horizontal position. A third unit (73) influences the support frame (3) in such a way that the vehicle (8), which it is situated in the raised testing position, is briefly rotated about a vertical axis (z). The test fixture is advantageously used to test a stabilizing system (ESP device) of the vehicle (8).

4 Claims, 5 Drawing Sheets

U.S. PATENT DOCUMENTS

| | | | |
|---|---|---|---|
| 6,145,180 | A | 11/2000 | Kogai et al. |
| 6,593,849 | B2 * | 7/2003 | Chubb et al. ............... 340/446 |
| 2003/0230137 | A1 * | 12/2003 | Kemp et al. .................. 73/117 |
| 2004/0003655 | A1 * | 1/2004 | Kemp et al. ............... 73/118.1 |

FOREIGN PATENT DOCUMENTS

| | | |
|---|---|---|
| FR | 2 764 008 | 12/1998 |
| JP | 04006434 | 1/1992 |
| WO | WO 96/26152 | 8/1996 |

* cited by examiner

METHOD FOR TESTING A STABILIZING SYSTEM OF A MOTOR VEHICLE BY TILTING AND ROTATING THE VEHICLE

This is a Divisional of U.S. application Ser. No. 09/965,886, filed Oct. 1, 2001, now U.S. Pat. No. 6,865,802, which is a Continuation of International Application PCT/DE00/00957, filed Mar. 29, 2000, which was published under PCT Article 21(2) in German. The disclosures of these Applications are incorporated herein by reference.

FIELD OF AND BACKGROUND OF THE INVENTION

The present invention relates to a dynamic test fixture for a motor vehicle, to a test stand and an assembly line, which include the dynamic test fixture, and to preferred applications of the same for testing a stabilizing system of a motor vehicle. The present invention additionally relates to an associated method.

Modern motor vehicles are increasingly equipped with electronic safety systems to improve functional characteristics, in particular the functional safety, of the vehicles. Examples of such safety systems include the so-called antilocking system, which acts on the brakes of a vehicle ("ABS" system), and the anti-skid control ("ASR" system), which influences the drive of a vehicle. Another important system component that is increasingly used in the construction of motor vehicles is a stabilizing system, which is designed to prevent the vehicle from tipping or overturning, in particular when the motor vehicle is driven on extremely curvy roads. Such systems are also called "electronic stability programs" ("ESP" devices). Specifically, these systems cause the braking of a wheel when the motor vehicle goes into a tilted position or into a spin during extreme driving maneuvers.

To assure the quality of such safety devices during the final inspection of a motor vehicle, for example, it is necessary to test the functionality of these devices when they are installed in the motor vehicle. Therein, it is a particular problem that, to date, no suitable devices have been available for testing a stabilizing system in a completely assembled vehicle that is ready to be delivered to the customer. More specifically, such testing relates to the functionality of position and/or acceleration sensors installed in the vehicle, and to their proper connection to an electronic controller.

German laid-open patent application DE 21 65 244 teaches a device for raising and tilting vehicles. The device has a lift assembly that includes a raisable part. During the lifting process, the raisable part acts on the base of the vehicle. Further, the lift assembly allows the raised vehicle to be tilted around its transverse axis.

In addition, European Patent Application EP 0 378 743 A1 teaches a device for raising vehicles. The device has guide rails, via which the vehicle can be positioned above the lifting device. During the lifting process, the device acts on the base of the vehicle, while the guide rails are lowered. The lift assembly allows the raised vehicle to be tilted around its transverse and longitudinal axes.

Published International Patent Application WO 96/26152 teaches a device for repairing vehicle chassis, whereby the vehicle is positioned above a support frame by means of a ramp. During the lifting process, the support frame acts on the vehicle base and allows the raised vehicle to be tilted around its transverse and longitudinal axes.

German laid-open patent application DE 31 44 621 A1 too teaches a lifting device for a motor vehicle. The lifting device is designed as a conveyor carriage: that acts on the vehicle base during the lifting process.

The prior art lifting devices are of a stationary type; that is, they raise a vehicle into a position for performing maintenance and repair operations. Generally, in order to perform these operations, the vehicle must be held still for a considerable period of time in this raised and, if necessary, inclined position. Any movements of the vehicle would interfere with the performance of these operations.

OBJECTS OF THE INVENTION

It is one object of the invention to provide a dynamic test fixture for a vehicle, and an associated method, whereby the vehicle can be brought only temporarily into positions that are different from the typical positions occurring in the normal operation of the vehicle. Such positions are generally undesired and typically occur in accident situations, for example. A further object of the invention is to provide a test stand that, in particular, can be implemented in an automated production device for motor vehicles and includes the above-mentioned dynamic test fixture. It is yet another object to provide a dynamic test fixture which is particularly suited for testing an electronic stabilizing system that is installed in the motor vehicle.

SUMMARY OF THE INVENTION

According to one formulation of the present invention, these and other objects of the invention are achieved by a dynamic test fixture that includes a support frame whose dimensions in the direction of a transverse axis of the vehicle are smaller than the distance between the wheels of the vehicle. The dynamic test fixture further includes a controllable adjusting device for the support frame. The controllable adjusting device, in turn, includes a lifting assembly, a tilting assembly, and a rotating assembly.

The lifting assembly moves the support frame from below toward the vehicle and lifts the vehicle to a raised testing position. Furthermore, the lifting assembly lowers the vehicle after completion of a testing procedure.

The tilting assembly acts on the support frame in such a way that the vehicle, when it is situated in the raised testing position, is moved, for a first predetermined period of time, into at least one position that deviates from the horizontal position of the vehicle.

The rotating assembly influences the support frame in such a way that the vehicle, when it is situated in the raised testing position, is rotated about a vertical axis for a second predetermined period of time.

According to another formulation of the invention, the dynamic test fixture for a vehicle has a support frame whose dimensions in the direction of a transverse axis of the vehicle are smaller than the distance between the wheels of the vehicle. This allows the vehicle to be automatically conveyed above the support frame, for example in a production device for manufacturing the vehicle.

This dynamic test fixture has a controllable adjusting device for the support frame. The adjusting device, in turn, has first means that move the support frame, from below, toward the vehicle, to bring the vehicle to a raised testing position, and to lower the vehicle after testing. Preferably, the adjusting device has second means that act on the support frame in such a way that, in the raised testing position, the vehicle is briefly moved into at least one position that deviates from the horizontal position.

Advantageously, the adjusting device has third means that influence the support frame in such a way that, in the raised testing position, the vehicle is briefly rotated about a vertical axis.

Therein, the sequence of the effects of the second and third means of the controllable adjusting device on the vehicle can be specified as a function of the application at hand. For example, in a first step, the second means move the vehicle briefly into a position that deviates from the horizontal position. After the vehicle is again positioned in the horizontal position, the third means engage and rotate the vehicle briefly around the vertical axis. If needed, the operational sequence of the second and third means can be changed, e.g. reversed. In this case, the vehicle would be first rotated and then tilted. According to another exemplary embodiment of the invention, the second and third means of the controllable adjusting device act simultaneously on the support frame. In this case, the vehicle is placed in at least one position that deviates from the horizontal position. Simultaneously, the vehicle is rotated around the vertical axis.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

Figure 1:
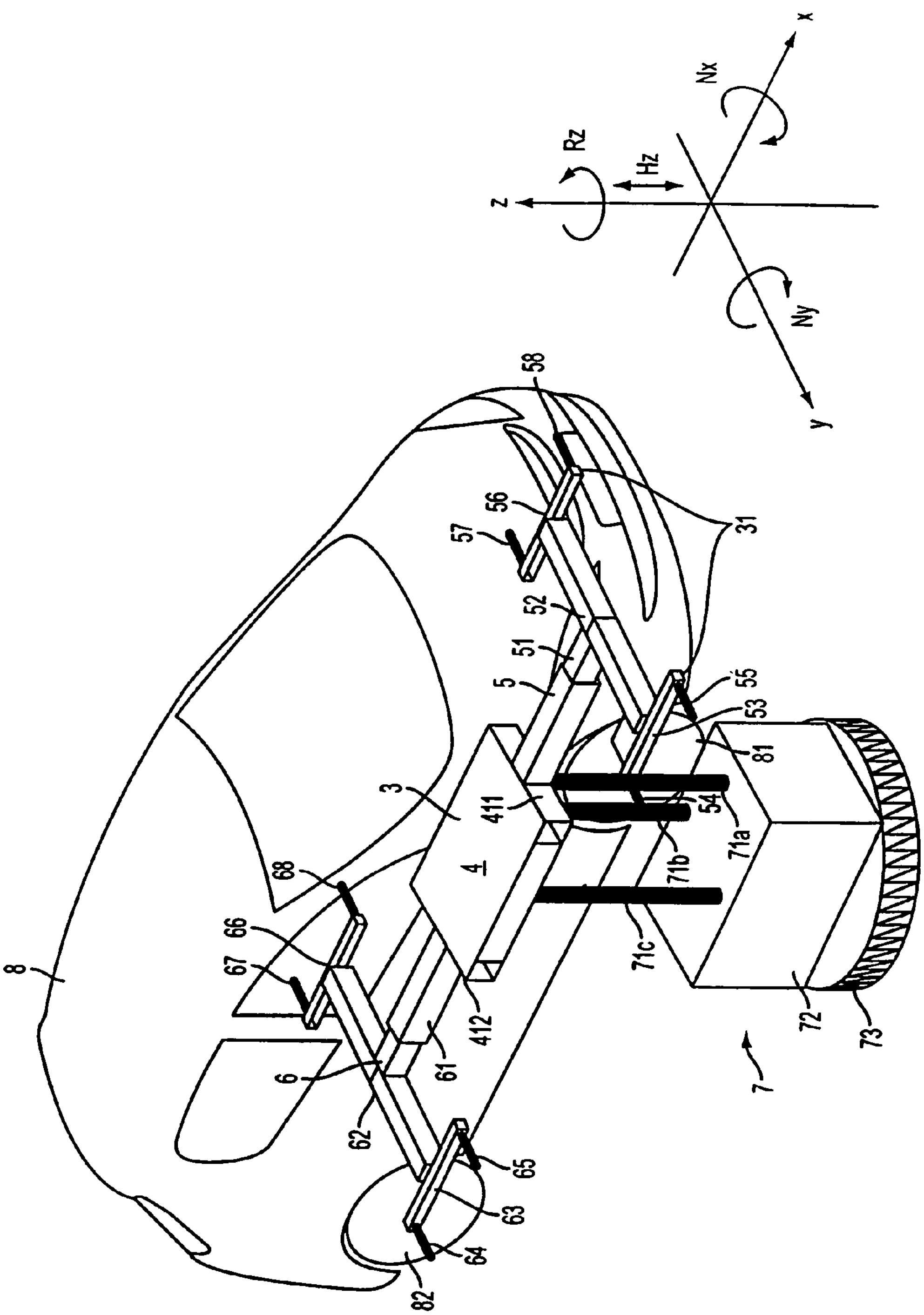
FIG. 1 shows a first embodiment of a dynamic test fixture according to the invention, together with a perspective view of a schematically represented vehicle.

FIG. 1 schematically shows a vehicle 8, which is gripped by a dynamic test fixture in accordance with a particularly advantageous embodiment of the present invention. The dynamic test fixture has a support frame 3 for the vehicle 8. The dimensions 31 of the dynamic test fixture in the direction of a transverse axis y of the vehicle are smaller than the distance between the wheels of the vehicle. This has the advantage that, in a first step, the vehicle 8 can be positioned above the support frame 3. Then, the support frame 3 can be moved, from below, toward the vehicle 8. In a first embodiment of the invention (not shown in the figures), the support frame 3 is placed in contact with the base region of the vehicle 8 when the support frame 3 is moved, from below, toward vehicle 8. In the following, the invention will be illustrated by means of exemplary embodiments, in which the support frame 3, when moved toward the vehicle 8 from below, comes into contact with the wheels of the vehicle 8.

The dynamic test fixture according to the invention has a controllable adjusting device 7 to drive the support frame 3. The controllable adjusting device 7 has a first unit that moves the support frame 3, from below, toward the vehicle 8 and that brings the vehicle 8 to a raised testing position. In accordance with the illustration in FIG. 1, the vehicle 8 is advantageously raised along a vertical axis z by a lift distance or height distance Hz. A second unit of the controllable adjusting device 7 can now act upon the support frame 3 in such a way that the vehicle 8 is situated in at least one position that deviates from the horizontal position. In FIG. 1, the horizontal position is represented by the intersection of a longitudinal axis x and a transverse axis y. Preferably, such a deviating position is reached by tilting the vehicle 8 along the transverse axis y, that is, by tilting the vehicle forward or backward, or by tilting the vehicle along the longitudinal axis x, that is, by tilting the vehicle laterally. In addition, a third unit of the controllable adjusting device 7 acts on the support frame 3 in such a way that the vehicle 8 is rotated around the vertical axis z.

Such a dynamic test fixture is especially suited for testing sensors of a stabilizing system (ESP device, or electronic stability program) of a motor vehicle. Typically, when testing the stabilizing system, which is installed in the motor vehicle, three test steps are performed. In a first test step, the motor vehicle 8 is tilted around the transverse axis y by means of the positioning device, wherein the angle of inclination Ny is larger than plus and/or minus 10.5° with respect to the horizontal position. In a second test step, the motor vehicle 8 is tilted around the longitudinal axis x by means of the positioning device, wherein the angle of inclination Nx is larger than plus and/or minus 10.5° with respect to the horizontal position. The vehicle 8 may also be rotated around the vertical axis z, wherein, in practice, the angle of rotation Rz is generally at least 40°, and wherein the angle Rz is passed through with an angular velocity of approximately 10°/second.

The tilting of the vehicle around the transverse axis y and the longitudinal axis x, and the rotation around the vertical axis z can be separately performed by the controllable adjusting device 7; that is, they can successively follow one another. In another embodiment of the dynamic test fixture according to the invention, the individual positional changes are superimposed. In this case, after completing the first step, the controllable adjusting device 7 acts on the support frame 3 in such a way that the vehicle 8 is both placed in positions that deviate from the horizontal position and rotated around the vertical axis z. Thus, if the vehicle 8 is tilted both by the inclination angle Ny and by the inclination angle Nx, and if the vehicle 8 is simultaneously rotated around the vertical axis z, the stabilizing system in the vehicle 8 can be quickly tested. This is particularly advantageous for rapidly moving automatic production devices for motor vehicles.

Preferably, the controllable adjusting device 7 of the dynamic test fixture according to the invention is arranged approximately vertically underneath the support frame 3 and acts in particular on the center of gravity of the support frame 3. In the preferred embodiment shown in FIG. 1, the controllable adjusting device 7 has a base 72 that is borne on a horizontal rotating unit 73. In FIG. 1, the horizontal rotating unit 73 assumes the function of the third unit. By means of the horizontal rotating unit 73, the controllable adjusting device 7 can be rotated around the vertical axis z, together with the support frame 3 and the vehicle 8, which are situated on the horizontal rotating unit 73 and the controllable adjusting device 7, respectively.

In the preferred embodiment of FIG. 1, the controllable adjusting device 7 has three adjusting units 71*a,* 71*b,* and 71*c* to achieve the tilting of the support frame 3 around the longitudinal and transverse axes x, y. Preferably, these adjusting units 71*a,* 71*b,* and 71*c* are designed as lifting cylinders. In the embodiment shown in FIG. 1, these lifting cylinders assume the function of the second unit. The lifting cylinders can be extended so that the support frame 3 performs the above-described positional changes that are required in particular for testing the stabilizing system of the vehicle 8. When the vehicle 8 is tilted around the transverse axis y, the adjusting units 71*c,* 71*b* must remain unchanged while the adjusting unit 71*a* is extended and retracted. When the vehicle 8 is tilted around the longitudinal axis x, the adjusting unit 71*a* must remain unchanged while the adjusting units 71*c,* 71*b* are mutually extended and retracted. Depending in particular on the vehicle weight and dynamic parameters such as the desired tilting and angular velocities during a test, a larger or smaller number of adjusting units can be provided. Another exemplary embodiment for achieving positional changes of the vehicle 8 will be illustrated with reference to FIGS. 4 and 5.

In the embodiment of a dynamic test fixture according to the invention shown in FIG. 1, the support frame 3 has a central support section 4. Along the vertical axis z, the controllable adjusting device 7 acts from below on the central support section 4 via the first unit, which, in the preferred embodiment of FIG. 1, is designed as the adjusting units 71*a,* 71*b,* and 71*c*. Advantageously, a first support arm 5 extends from a front face 411 of the central support section 4 and a second support arm 6 extends from a rear face 412 of the central support section 4. Both support arms extend along the longitudinal axis x of the vehicle 8, thus being able to support practically the entire vehicle base. Advantageously, the support arms 5, 6 extend from the central support section 4 to the front and rear axles of the vehicle 8 and support the vehicle 8 at these points.

In the exemplary embodiment of a dynamic test fixture according to the invention shown in FIG. 1, the first and second support arms 5, 6 each have a longitudinal telescoping arm 51, 61 that can extend and retract along the longitudinal axis x of the vehicle 8. Preferably, a transverse telescoping arm 52, 62 is situated at the end of each longitudinal telescoping arm 51, 61, which can extend and retract along the transverse axis y of the vehicle 8. The overhanging projection of the dynamic test fixture can advantageously be adjusted to the distance between the vehicle axles by means of the longitudinal telescoping arms 51, 61, while the transverse telescoping arms 52, 62 can be adjusted to the track width of the vehicle 8.

According to the exemplary embodiment shown in FIG. 1, the support frame 3 of the dynamic test fixture has gripping units 53, 56, 63, and 66, each of which is assigned to one wheel of the vehicle 8. The gripping units 53, 56, 63, and 66 engage with a respective wheel of the vehicle 8 to at least move the vehicle 8 into a raised position. It is advantageous for the gripping units 53, 56, 63, and 66 to be mounted on the outer ends of the extendable and retractable transverse telescoping arms 52, 62 of the support arms 5, 6. Thus, in the exemplary embodiment of FIG. 1, the gripping units 53, 56 are mounted on the transverse telescoping arm 52 of the first support arm 5 and grip the wheels on the front axle of the vehicle 8. FIG. 1 shows a right front wheel 81, which is held by the gripping unit 53. In addition, as shown in the exemplary embodiment of FIG. 1, the gripping units 63, 66 are mounted on the transverse telescoping arm 62 of the second support arm 6 and grip the wheels on the rear axle of the vehicle 8. FIG. 1 shows a right rear wheel 82, which is held by the gripping unit 63.

Advantageously, the gripping units 53, 56, 63, 66 have extendable and retractable support pins that can be extended along the transverse axis y of the vehicle 8 in such a way that the support pins contact the underside of the vehicle wheels. Such an exemplary embodiment of the present invention is shown in FIG. 1. Preferably, the gripping units 53, 56, 63, and 66 have pairs of extendable and retractable support pins 54 and 55, 57 and 58, 64 and 65, and 67 and 68, respectively. As noted above, the support pins are extendable in the direction of the transverse axis y of the vehicle 8 in such a way that they contact the underside of the wheels 81, 82 of the vehicle 8. Such an arrangement has the advantage that the vehicle 8 can be positioned above the dynamic test fixture in a simple manner, for example by self-propulsion. Subsequently, the dynamic test fixture can be adjusted to the particular dimensions of the vehicle by appropriate extension of the longitudinal telescope arms 51, 61, transverse telescope arms 52, 62, and support pins 54, 55, 57, 58, 64, 65, 67, and 68.

Figure 2:
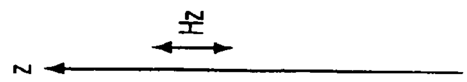
FIG. 2 shows a perspective view of a first embodiment of a test stand having a dynamic test fixture according to FIG. 1.
Figure 2:
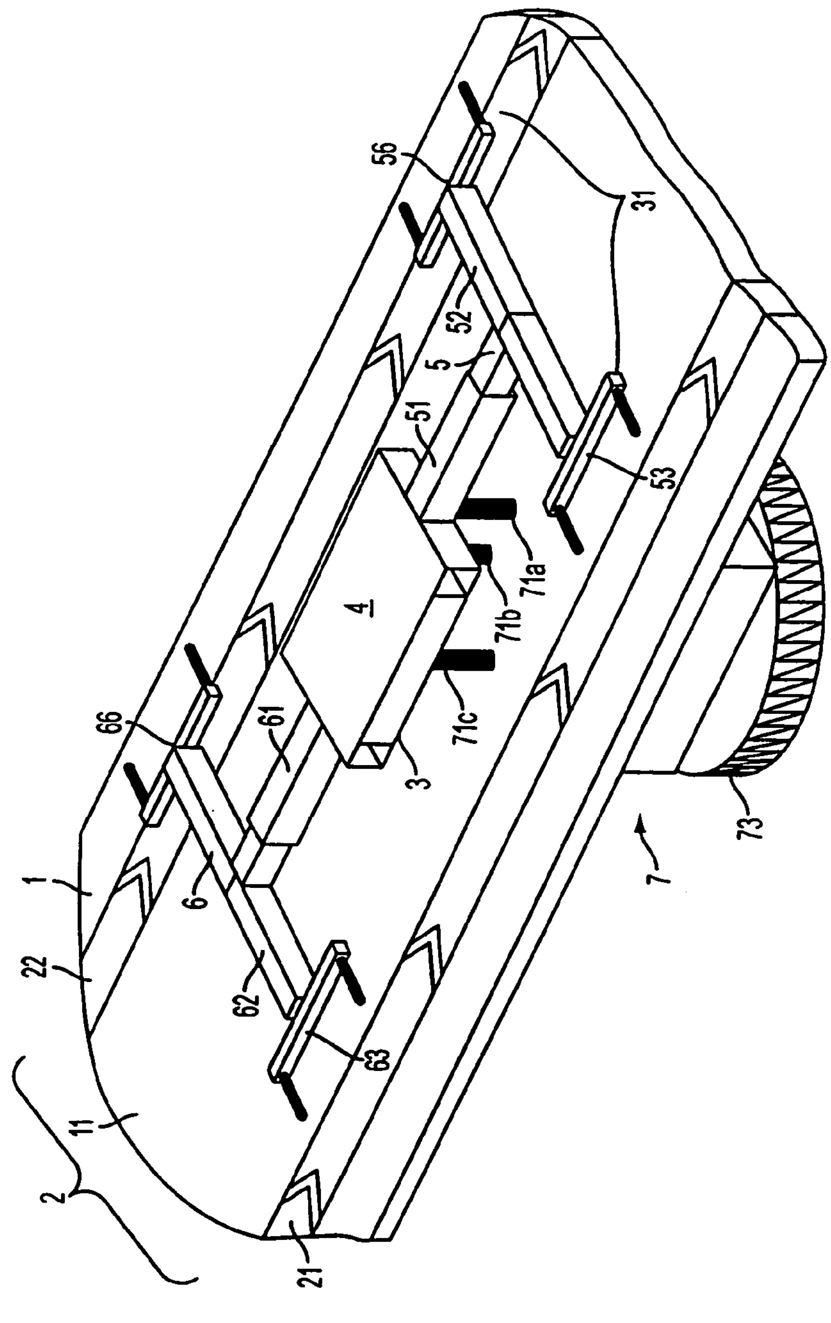

This advantage is readily apparent from the exemplary embodiment shown in FIG. 2. FIG. 2 shows a perspective view of a first embodiment of a test stand that is equipped with the dynamic test fixture according to FIG. 1. The test stand includes a conveyance device 2, which is arranged on an assembly plane 1. By means of the conveyance device 2, the vehicle 8 can be automatically led to the dynamic test fixture, placed thereon, and led away again. Advantageously, the conveyance device 2 has two parallel conveyor belts 21, 22 upon which the wheels of the vehicle 8 rest. Thus, the vehicle 8 can be placed above the dynamic test fixture 3 without self-propulsion. Therein, the dynamic test fixture 3 is arranged in a space 11 between the conveyor belts 21, 22. After the vehicle 8 is positioned above the dynamic test fixture, the dynamic test fixture can be adjusted to the particular dimensions of the vehicle 8 by appropriate extension of the longitudinal telescoping arms 51, 52 and the transverse telescoping arms 52, 62, as previously described. By extending the support pins 54, 55, 57, 58, 64, 65, 67, and 68 at the ends of gripping units 53, 56, 63, and 66, the parallel conveyor belts 21, 22 are overlapped by the support pins. The wheels of the vehicle 8 can now be gripped and the vehicle 8 can be lifted to the raised testing position.

Figure 3:
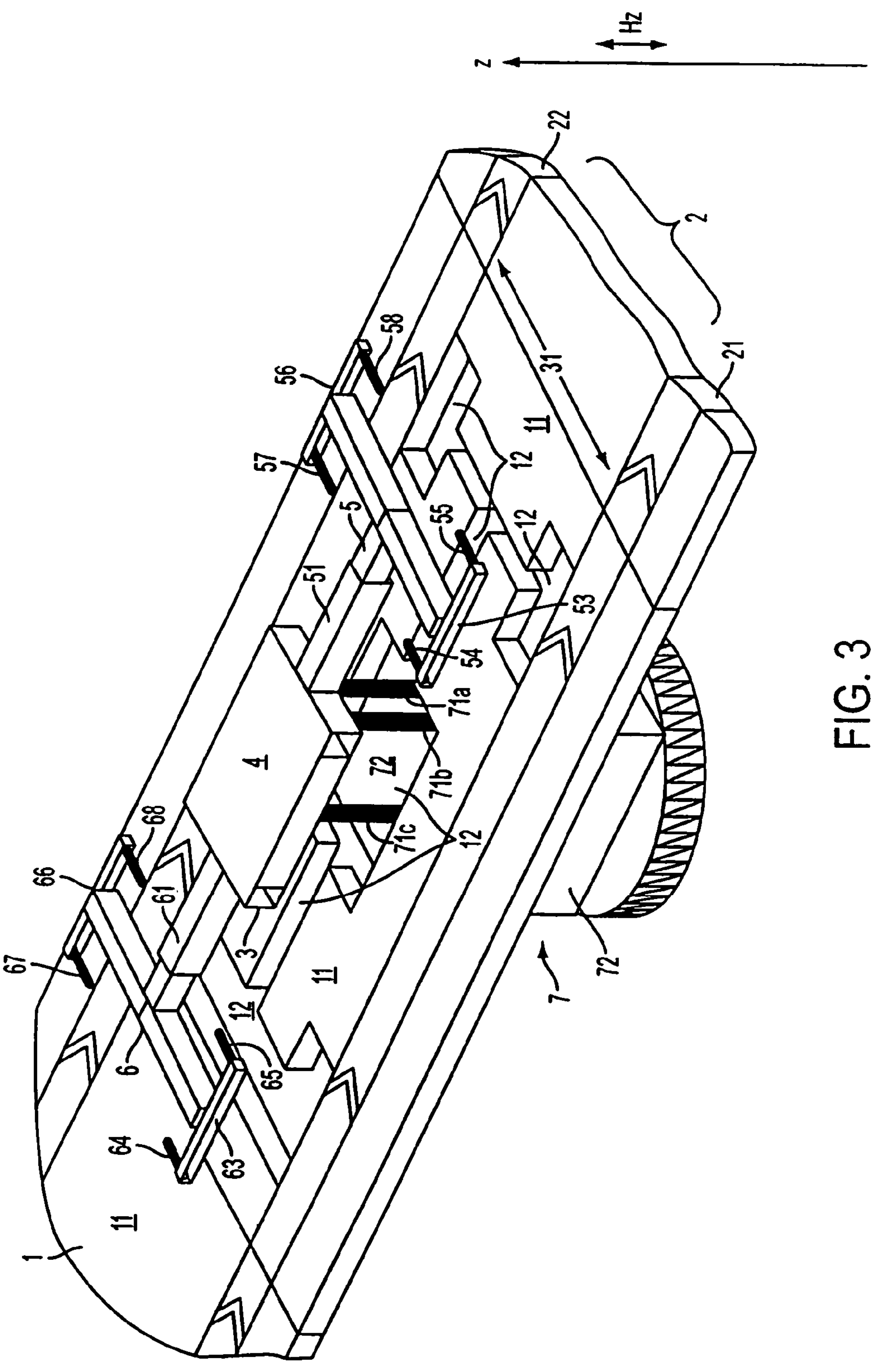
FIG. 3 shows a perspective view of a second embodiment of a test stand having a dynamic test fixture according to FIG. 1.

FIG. 3 shows a further exemplary embodiment of the test stand according to the present invention. Therein, the dynamic test fixture can be lowered into the assembly plane 1 between the parallel conveyor belts 21, 22 of the conveyance device 2. Advantageously, the assembly plane 1 has several cavities that are adapted to the geometric structure of the dynamic test fixture in such a way that in particular the central support section 4 of the assembly plane 1 and the support arms 5, 6 extending therefrom can be lowered into the assembly plane 1. Furthermore, there is an opening in the center, through which the adjusting units 71*a,* 71*b,* and 71*c* of the adjusting device 7 penetrate and through which the adjusting units 71*a,* 71*b,* and 71*c* engage with the central support section 4. In the state of the test stand shown in the exemplary embodiment of FIG. 3, the pairs of the support pins 54 and 55, 57 and 58, 64 and 65, and 67 and 68 at the ends of the gripping units 53, 56, 63, and 66 are not yet extended. The transverse dimensions of the dynamic test fixture are thus smaller than the distance between the vehicle wheels and a distance 31 between the two conveyor belts 21, 22 of the conveyance device 2.

Figure 4:
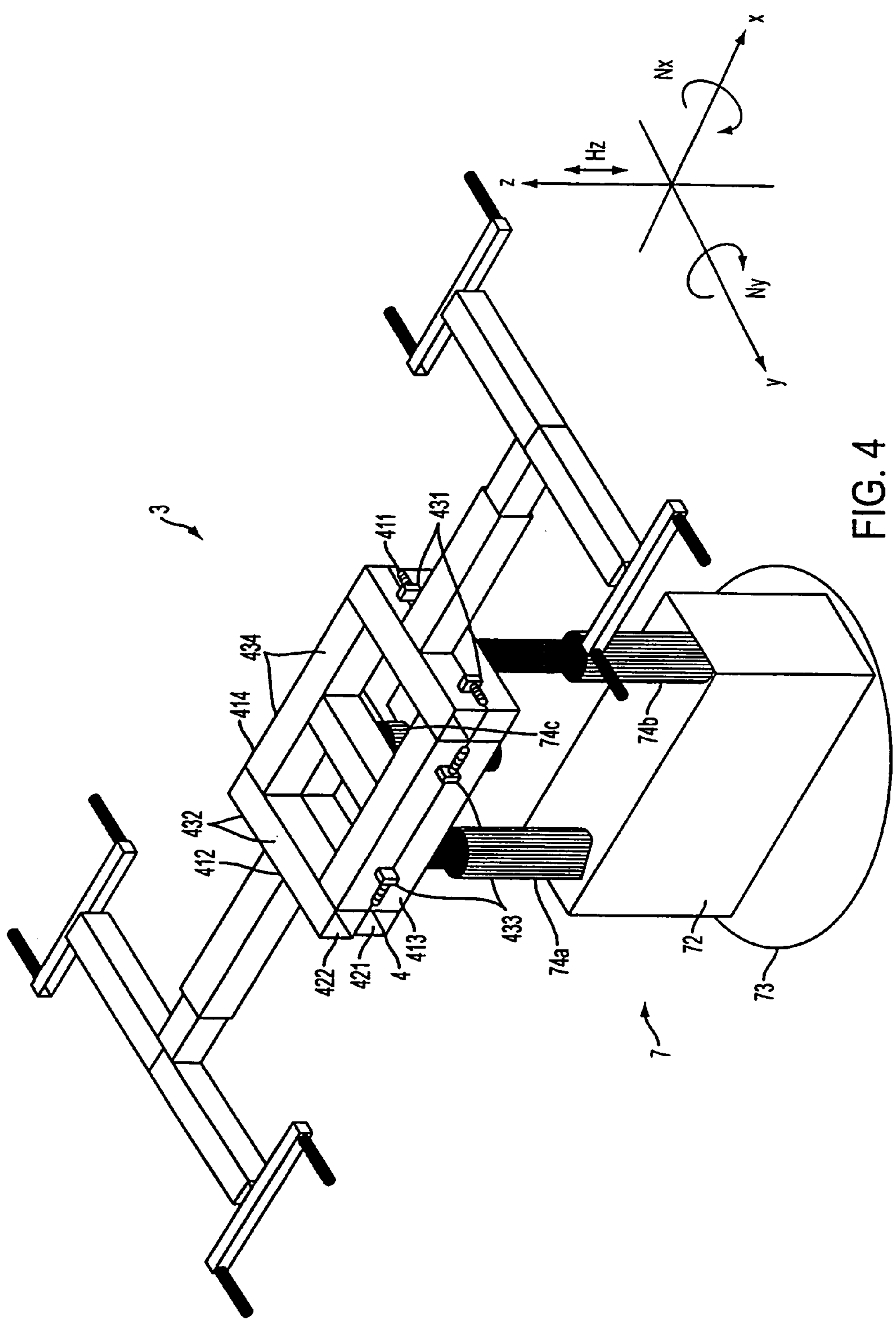
FIG. 4 shows a perspective view of a second embodiment of a dynamic test fixture according to the invention.
Figure 5:
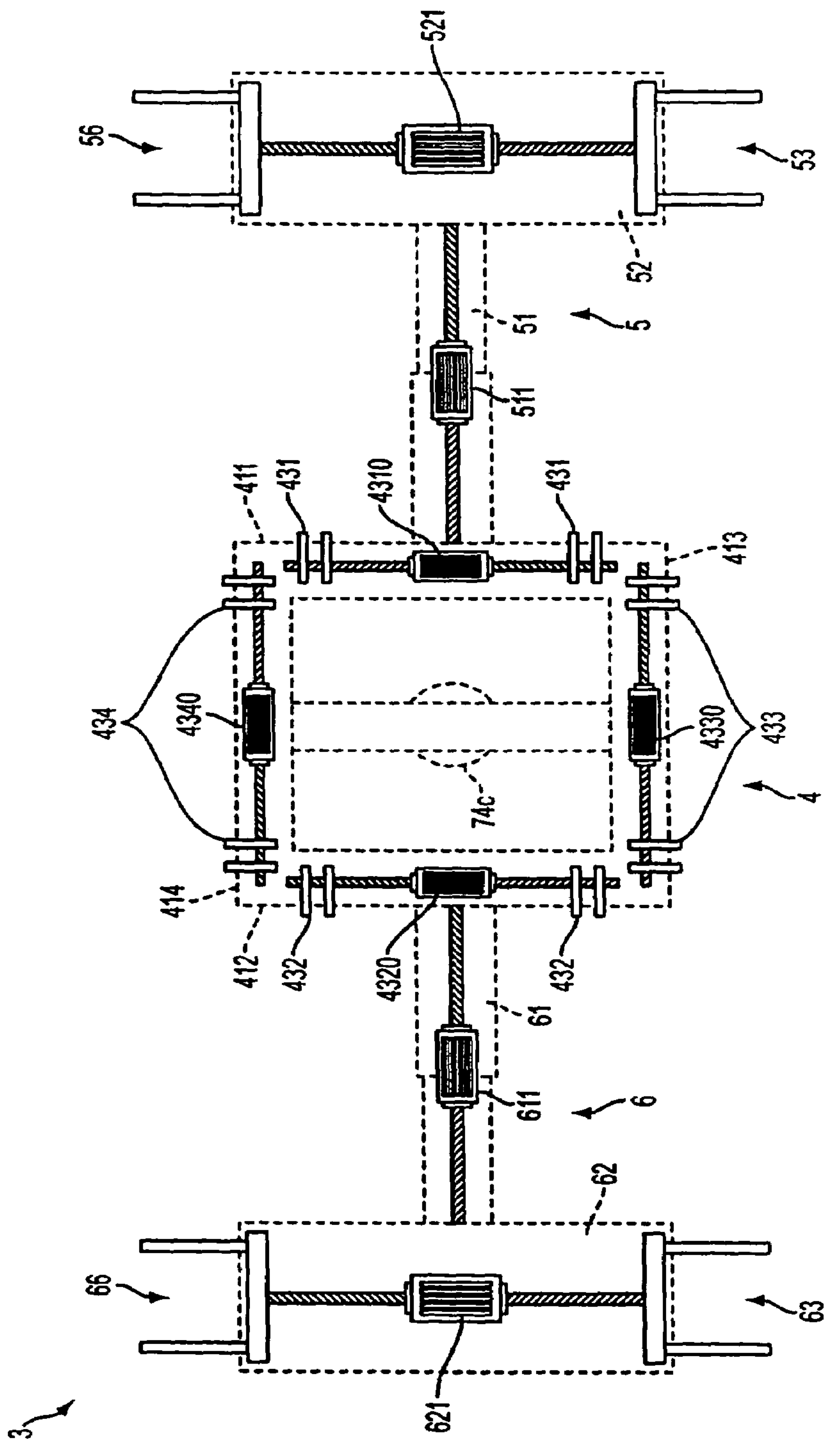
FIG. 5 shows a schematic top view of the dynamic test fixture according to FIG. 4.

A further advantageous embodiment of a dynamic test fixture according to the invention is illustrated in FIGS. 4 and 5. Therein, the central support section 4 has a lower frame 421 and an upper frame 422. The frames 421, 422 lie one atop the other and are interconnected by means of controllable closing devices 431, 432, 433, 434 in such a way that the upper frame 422 can be tilted along the longitudinal axis x or the transverse axis y of the vehicle 8. The closing devices 431, 432 are mounted on front and rear faces 411, 412, and the closing devices 433, 434 are mounted on right and left faces 413, 414. These closing devices 431, 432, 433, and 434 can be individually released and locked in such a way that the upper frame 422 can be tilted along any desired longitudinal or transverse axis x, y of the vehicle 8. If, for example, the closing devices 433 are locked, whereby both frames 421, 422 are interconnected on the right longitudinal side 413, while all the other closing devices 431, 432, and 434 are released, the upper frame 422 can be tilted around the longitudinal axis x. Thus, a vehicle situated on the dynamic test fixture can be tilted around the longitudinal axis x, that is, opposite to the rotation direction Nx. On the other hand, if, for example, the closing devices 431 are locked, so that both frames 421, 422 are interconnected at the front face 411, while all the other closing devices 432, 433, and 434 are released, the upper frame 422 can be tilted around the transverse axis y. Thus, a vehicle situated on the dynamic test fixture 3 can be tilted around the transverse axis y, that is, in the rotation direction Ny. Advantageously, the first and second support arms 5, 6 extend from the front and rear faces 411, 412 of the upper frame 422 of the central support section 4.

To perform the tilting operations described above, it is advantageous that a third lifting unit 74*c* is arranged between the lower and upper frame 421, 422 of the central support section 4. In the exemplary embodiment of FIG. 4, the two lifting units 74*a*, 74*b* underneath the central support section 4 cause the dynamic test fixture only to be lifted into the testing position.

FIG. 5 shows a schematic top view of a second embodiment of the dynamic test fixture according to FIG. 4. Therein, a spindle drive 511 is arranged in the extendable and retractable longitudinal telescoping arm 51 of the first support arm 5. Furthermore, a spindle drive 521 is arranged in the extendable and retractable transverse telescoping arm 52. In addition, a spindle drive 611 is arranged in the extendable and retractable longitudinal telescoping arm 61 of the second support arm 6, and a spindle drive 621 is arranged in the extendable and retractable transverse telescoping arm 62. The transverse telescoping arms 52, 62 can be positioned below the axles of a vehicle by means of the spindle drives 511, 611, while the spindle drives 521, 621 enable the pairs of support pins 54 and 55, 57 and 58, 64 and 65, and 67 and 68 of the gripping units 53, 56 and 63, 66 to be extended and retracted at the top ends of the transverse telescoping arms 52 and 62. FIG. 5 shows additional spindle drives 4310, 4320, 4330, and 4340, which are arranged on the sides 411, 412, 413, and 414, respectively, and which enable the controllable closing devices 431, 432, 433, and 434 to be released or locked.

The above-described dynamic test fixture is particularly advantageous for testing a stabilizing system ("ESP device") of a motor vehicle. Therein, it is preferable that the functionality of the sensors of a stabilizing system can be tested. Advantageously, test stands that include such a dynamic test fixture are integrated into an automatic production device for vehicles, in particular in order to automatically test stabilizing systems of the motor vehicles that are produced with the automatic production device.

The dynamic test fixture according to the invention can also be integrated into a multiple test stand, with which, in addition to the stabilizing system, other vehicle components are tested. Thus, a combination with a roll test device can be provided, in which in particular the brakes and the antilocking system of a vehicle are tested. In this case, the conveyor belts 21, 22 shown in the exemplary embodiment according to FIG. 2 could be components of the roll test device in the multiple test stand.

It is one of the advantages of the present invention that a dynamic test fixture of the type described above can be integrated into practically any desired location of an assembly line for motor vehicle production. It need only be assured that at least the vehicle chassis, including the wheels, is completely assembled. Completion of the vehicle interior, such as the seat assembly, and further exterior work such as the installation of window glass, lighting apparatus, and much more can be performed by using subsequent assembly line equipment.

In another embodiment of the invention, the dynamic test fixture can be placed at the end of the of the assembly line, that is, in a so-called testing or finishing area where final inspection of the completely assembled vehicles takes place. After passing by the dynamic test fixture according to the invention, the tested vehicles are transported from the assembly line and, if appropriate, led to individual assembly cells. In the individual assembly cells, finishing work is performed in order to eliminate defects that were detected in the testing or finishing area, for example.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications that fall within the spirit and scope of the invention, as defined by the appended claims, and equivalents thereof.

What is claimed is:

1. A method, comprising:

lifting a vehicle having a stabilizing system to a testing position;

in the testing position and during operation of the stabilizing system, tilting the vehicle for a first period of time into a tilted position that deviates from a horizontal position of the vehicle;

in the testing position and during operation of the stabilizing system, rotating the vehicle for a second period of time around a vertical axis of the vehicle; and analyzing the operation of the stabilizing system of the vehicle.

2. The method of claim 1, further comprising predetermining respective angular velocities for the tilting step and the rotating step.

3. The method of claim 1, wherein, in the testing step, sensors of the stabilizing system are tested.

4. The method of claim 1, further comprising testing components of the vehicle other than the stabilizing system.

* * * * *